(12) United States Patent
May et al.

(10) Patent No.: US 10,233,374 B2
(45) Date of Patent: Mar. 19, 2019

(54) POLYMER-BASED DRILLING FLUIDS CONTAINING NON-BIODEGRADABLE MATERIALS AND METHODS FOR USE THEREOF

(71) Applicant: Halliburton Energy Services, Inc., Houston, TX (US)

(72) Inventors: Preston Andrew May, New Caney, TX (US); Ryan Patrick Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 26 days.

(21) Appl. No.: 15/311,993

(22) PCT Filed: Aug. 5, 2014

(86) PCT No.: PCT/US2014/049705
§ 371 (c)(1),
(2) Date: Nov. 17, 2016

(87) PCT Pub. No.: WO2016/022101
PCT Pub. Date: Feb. 11, 2016

(65) Prior Publication Data
US 2017/0121586 A1    May 4, 2017

(51) Int. Cl.
*C09K 8/10* (2006.01)
*C09K 8/03* (2006.01)
(Continued)

(52) U.S. Cl.
CPC ............ *C09K 8/10* (2013.01); *C09K 8/03* (2013.01); *C09K 8/12* (2013.01); *C09K 8/514* (2013.01);
(Continued)

(58) Field of Classification Search
None
See application file for complete search history.

(56) References Cited

U.S. PATENT DOCUMENTS 2,570,947 A * 10/1951 Himel .................... C09K 8/206
507/114
3,989,630 A * 11/1976 Walker .................... C09K 8/05
175/65
(Continued)

FOREIGN PATENT DOCUMENTS

EP    0731253 A2    9/1996
EP    2075300 A1    7/2009
(Continued)

OTHER PUBLICATIONS

International Search Report and Written Opinion for PCT/US2014/049705 dated Apr. 13, 2015.

*Primary Examiner* — William D Hutton, Jr.
*Assistant Examiner* — Charles R Nold
(74) *Attorney, Agent, or Firm* — Tenley Krueger; C. Tumey Law Group PLLC

(57) ABSTRACT

Polymer-based drilling fluids may be used as an alternative to drilling fluids containing bentonite or other clay materials, although filter cake formation with polymer-based drilling fluids can often be inadequate. Drilling methods can comprise: providing a drilling fluid comprising a carrier fluid, a non-crosslinked hydroxyalkylcellulose polymer, and a plurality of non-biodegradable particulates; drilling a borehole in the presence of the drilling fluid; and forming a filter cake within the borehole, the filter cake comprising the non-crosslinked hydroxyalkylcellulose polymer and the non-biodegradable particulates.

9 Claims, 1 Drawing Sheet

(51) Int. Cl.
  *C09K 8/516* (2006.01)
  *E21B 21/06* (2006.01)
  *E21B 33/138* (2006.01)
  *C09K 8/514* (2006.01)
  *C09K 8/12* (2006.01)
  *E21B 21/00* (2006.01)

(52) U.S. Cl.
  CPC ............ *C09K 8/516* (2013.01); *E21B 21/003* (2013.01); *E21B 21/06* (2013.01); *E21B 33/138* (2013.01)

(56) References Cited

U.S. PATENT DOCUMENTS

| | | |
|---|---|---|
| 3,993,570 A | 11/1976 | Jackson et al. |
| 4,172,055 A * | 10/1979 | DeMartino ............. C06B 47/14 524/43 |
| 4,363,736 A | 12/1982 | Block |
| 4,629,573 A | 12/1986 | Raines |
| 5,728,652 A | 3/1998 | Dobson, Jr. et al. |
| 7,829,506 B1 | 11/2010 | Tehranchi |
| 7,857,051 B2 | 12/2010 | Abad et al. |
| 8,585,819 B2 | 11/2013 | Al-Bagoury |
| 8,691,737 B2 | 4/2014 | Chatterji et al. |
| 2008/0161209 A1 | 7/2008 | Wood |
| 2013/0220607 A1 | 8/2013 | Phatak et al. |
| 2013/0303412 A1 | 11/2013 | Luyster et al. |
| 2014/0151043 A1* | 6/2014 | Miller ..................... E21B 34/14 166/285 |
| 2014/0155302 A1* | 6/2014 | Al-Bagoury ........... C09K 8/032 507/140 |
| 2016/0046852 A1 | 2/2016 | May |

FOREIGN PATENT DOCUMENTS

| | | |
|---|---|---|
| WO | 2013068771 A1 | 5/2013 |
| WO | WO-2016022101 A1 | 2/2016 |

* cited by examiner

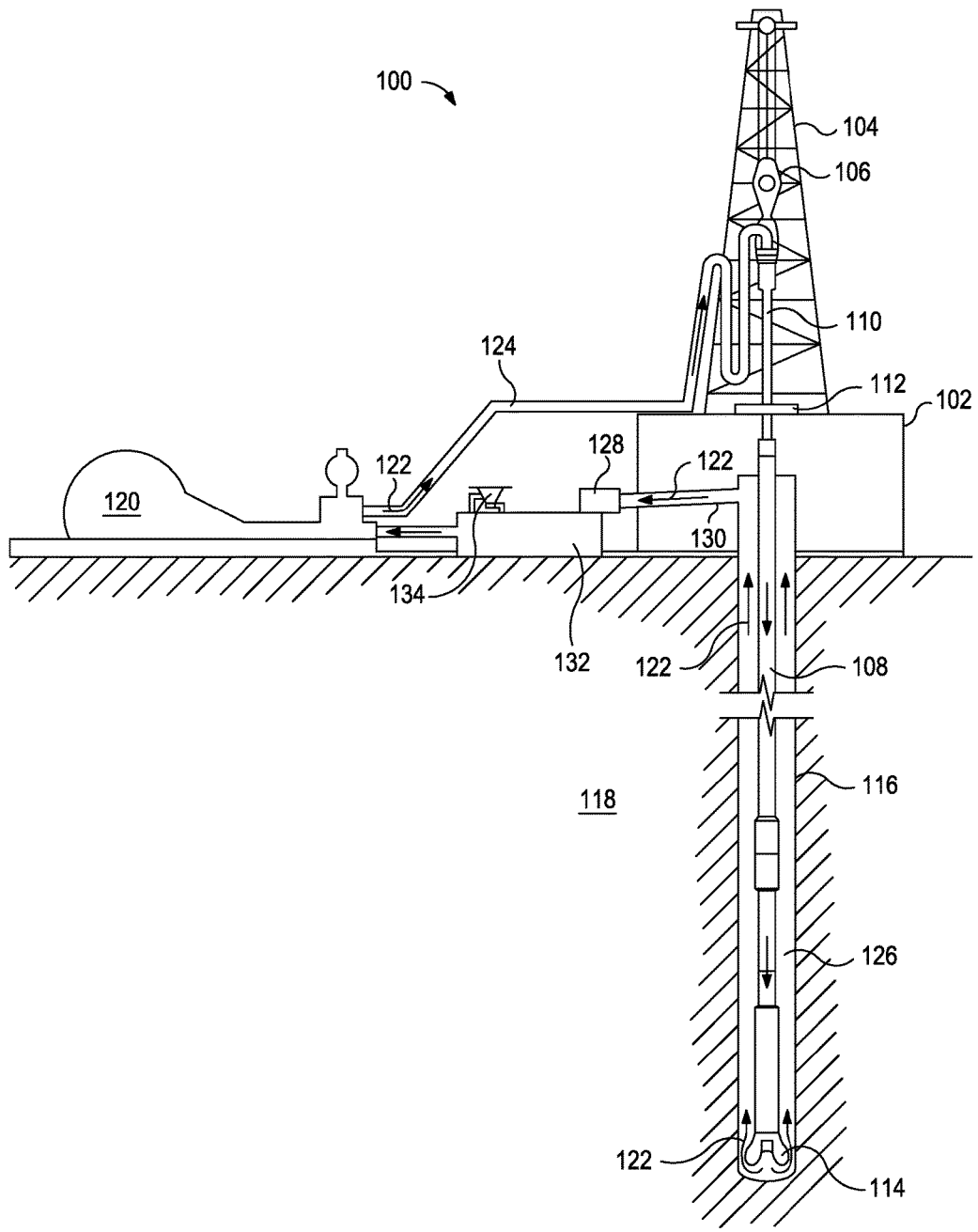

POLYMER-BASED DRILLING FLUIDS CONTAINING NON-BIODEGRADABLE MATERIALS AND METHODS FOR USE THEREOF

BACKGROUND

The present disclosure generally relates to methods for drilling a borehole in a subterranean formation or like geological structure, and, more specifically, to polymer-based drilling fluids and methods for their use in mitigating fluid loss during drilling operations.

Earthen boreholes are drilled for a number of applications including, for example, oil and gas exploration and production, minerals exploration and production, water sourcing, and the like. Construction-related drilling projects can similarly prepare boreholes suitable for laying pipelines or cables, or establishing locations for footings or pilings of a structure. Although these applications each involve a drilling process of some form, there are fundamental differences that may dictate how the drilling process is conducted in one application versus another.

During drilling operations, a drilling fluid is usually used to cool the drill bit, to control pressure within the borehole, and to suspend and transport drill cuttings from the borehole to the earth's surface. It is usually desirable to control loss of the drilling fluid from the borehole into porous features of the subterranean matrix. Although there are a number of reasons that fluid loss control is desirable during a drilling operation, weakening of the subterranean matrix by excessive fluid incursion is often an overriding concern. Fluid loss into the subterranean matrix can usually be lessened by forming a filter cake within the borehole. In most instances, the drilling fluid is formulated with materials that promote formation of a filter cake upon initial spurt loss of the drilling fluid to the subterranean matrix. In oil and gas production, the filter cake can also mitigate the premature incursion of various formation fluids into the wellbore during drilling, and the filter cake can thereafter be removed to allow production to commence. In other types of drilling applications, however, it is not necessarily the case that the filter cake is removed once the borehole is complete.

As indicated above and discussed further hereinafter, different types of drilling applications may vary in several aspects. Although drilling fluids may function similarly across various drilling applications, the properties of the drilling fluids are usually adapted to focus on the needs of a particular application. For example, mining applications, particularly mineral exploration applications, tend to use smaller wellbores and drill bits than do oil and gas applications. The small annular space present within typical mining applications can make less viscous drilling fluids desirable, such that they can be more easily circulated within the borehole. The highly mineralized formations commonly associated with mining applications can also make tailoring of the drilling fluid desirable to accommodate localized conditions of porosity, pH and temperature that may be present. Similarly, water wells, particularly potable water wells, are limited in the types of materials that can be used in formulating a drilling fluid for the well.

Drilling fluids often contain a plurality of bridging particulates that collectively form a fluid-blocking filter cake across pore throats and other porous features on the walls of the borehole. Degradable polymers are commonly used for this purpose, particularly in oil and gas exploration and production, where induced-degradation or self-degradation of the bridging particulates may be desirable upon commencing production operations. Degradable polymers, particularly biodegradable polymers, may also be particularly desirable from an environmental standpoint in such applications.

In other applications, degradable polymers and other degradable materials can be undesirable, and counterintuitively can represent an environmental concern. For example, in water well drilling, polymer degradation products may result in contamination of a water source encroached by the wellbore, possibly making the water source unsuitable for use or consumption. Biodegradable polymers lost to the subterranean matrix in such applications can represent a food source for various bacteria, possibly resulting in formation damage and/or water source fouling from uncontrolled bacteria growth. Related issues can also be encountered in mineral wells and like boreholes. For example, the generation of degradation products in a mineral well can further complicate an already complex mineralogical profile within the borehole.

Some drilling fluids use bentonite or other clay derivatives in order to convey viscosity to the fluid and to promote formation of a filter cake during drilling. For fluid loss control purposes, bentonite and other clay derivatives are used in combination with various charged polymers, since at typical working concentrations neither the clay nor the polymer component are usually effective for this purpose alone. The use of bentonite and other clays can prove problematic in a number of instances. In concentrations effective for promoting fluid loss control, clays can often produce drilling fluid viscosities that are too high for effective use in mineral wells and related types of boreholes. Due to their layered molecular structure, clays are also susceptible to swelling in the presence of ionic materials, such as subterranean brines, which can result in further changes in viscosity. Costs associated with disposal of clay-containing drilling fluids can also be highly problematic, and some locales have even regulated or banned their use.

BRIEF DESCRIPTION OF THE DRAWING

The following figure is included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 1 shows an illustrative schematic of a drilling assembly using the drilling fluids of the present disclosure, according to one or more embodiments.

DETAILED DESCRIPTION

The present disclosure generally relates to methods for drilling a borehole in a subterranean formation or like geological structure, and, more specifically, to polymer-based drilling fluids and methods for their use in mitigating fluid loss during drilling operations.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, the use of bentonite and other clay derivatives for purposes of achieving fluid loss control can be exceedingly problematic. Due to these difficulties, the present inventors investigated whether alternative materials or combinations of materials, particularly non-biodegradable materials, could provide effective fluid loss control during drilling operations.

Surprisingly and advantageously, the present inventors discovered that the combination of a non-crosslinked polymer and a plurality of non-degradable particulates was operable to provide effective fluid loss control during a drilling operation. In more specific embodiments of this discovery, the non-crosslinked polymer can comprise a hydroxyalkylcellulose polymer and the non-degradable particulates can comprise silica particulates. Both of these materials have the advantage of being non-biodegradable, which can be advantageous for a number of drilling applications, such as those discussed above. The combination of a hydroxyalkylcellulose polymer and silica particulates, as well as related combinations of non-biodegradable polymers and non-biodegradable particulates, can also be advantageous in other various respects, as further discussed hereinbelow.

Foremost, the combination of a hydroxyalkylcellulose polymer and silica particulates can effectively promote fluid loss control at concentrations where neither component acting alone is effective for this purpose. In this respect, there may be a synergistic fluid loss enhancement effect provided by the interaction of the two components with each other, allowing a lower load of filter cake-forming materials to be used in the drilling fluid than would otherwise be possible. At the very least, lowering the load of the filter cake-forming materials decreases cost of goods and can desirably maintain the viscosity of the drilling fluids at a low level.

As indicated above, silica particulates represent a particularly advantageous non-biodegradable material suitable for practicing the various embodiments described herein. Although silica is sometimes considered to be an undesirable material in oilfield operations due to the permeability reduction and scaling issues that can result from deposition of insoluble silicates and aluminosilicates, particularly when acidizing a siliceous formation, these issues are less problematic in many other types of drilling operations. In particular, silica particulates are sufficiently chemically inert for use in drilling operations for water wells and mineral wells, for example.

As a further advantage, silica particulates are also inexpensive and are available in bulk from numerous manufacturers in a variety of particle sizes and particle size distributions. Advantageously, in the embodiments described herein, the size of the silica particulates, or generally the size of the non-biodegradable particulates, can be adjusted to promote more effective fluid loss control. Specifically, smaller silica particulates promote better fluid loss control, thereby allowing lower concentrations of the silica particulates to be used in formulating the drilling fluids described herein. By using low concentrations of silica particulates in the drilling fluids, the cost of goods may be further decreased and the drilling fluids' viscosity values may be maintained at a desirably low level. Moreover, silica particulates may promote effective fluid loss control at much lower concentrations than can bentonite and other clay derivatives, thereby further highlighting the viscosity advantages that the present drilling fluids provide over the current state of the art. The low viscosity state provided by the drilling fluids of the present disclosure can be particularly advantageous when drilling spatially confined boreholes, such as those used in mineral exploration.

Another advantage of silica particulates compared to other types of non-biodegradable particulates, particularly bentonite and other clay derivatives, is that silica particulates are uncharged. Therefore, silica particulates and like non-biodegradable particulates are less prone to swelling in the presence of ionic materials, such as subterranean brines. The non-swelling nature of silica particulates can again be advantageous for maintaining a drilling fluid in a low viscosity state.

Hydroxyalkylcellulose polymers are also advantageous in the context of the embodiments described herein, since these polymers are also non-biodegradable, non-ionic, inexpensive, and provide similar advantages to those noted above for silica particulates. Although other cellulose derivatives also possess the feature of being non-biodegradable and may be used in the embodiments described herein, hydroxyalkylcellulose polymers are believed to be particularly advantageous for the reasons noted hereinafter.

The free hydroxy groups in hydroxyalkylcellulose polymers promote ready solubility of these polymers in aqueous fluids, which represents an advantage of these polymers compared to some other cellulose derivatives. Fully hydroxyalkylated cellulose has a degree of substitution of approximately three, meaning that each β-D-glucose monomer unit has all of its hydroxy groups substituted with a hydroxyalkyl group. The terminal hydroxy groups of fully or incompletely (i.e., a monomer degree of substitution less than 3) hydroxyalkylated cellulose can also be further oligomerized with one or more additional hydroxyalkyl groups to produce hydroxyalkylcelluloses having a higher degree of substitution, such as an alkyl degree of substitution greater than three for fully hydroxyalkylated cellulose. In general, any hydroxyalkylcellulose polymer having any degree of substitution may be used in the embodiments described herein, provided that the hydroxyalkylcellulose polymer is at least partially water-soluble and interacts effectively with the non-biodegradable particulates to promote fluid loss control. Further description of suitable hydroxyalkylcellulose polymers is included below.

A further advantage of hydroxyalkylcellulose polymers in the context of the embodiments described herein is that they may effectively promote fluid loss control when in a non-crosslinked state. Crosslinking in a hydroxyalkylcellulose polymer may occur, for example, by establishing chemical bridges between the terminal hydroxy groups of one or more adjacent cellulose polymer chains. However, crosslinked hydroxyalkylcellulose polymers may no longer be water-soluble and they may undesirably promote excessive viscosification when present in a drilling fluid. Therefore, hydroxyalkylcellulose polymers are desirably non-crosslinked in the embodiments described herein.

As alluded to in the foregoing, the combination of a hydroxalkylcellulose polymer and non-biodegradable particulates, particularly silica particulates, does not usually significantly alter the viscosity of a drilling fluid at concentrations effective for achieving fluid loss control. Although the viscosity of the drilling fluid may be regulated to some degree by altering the concentration and/or molecular weight of the hydroxyalkylcellulose polymer, and/or the concentration of the non-biodegradable particulates, the viscosity of the drilling fluids can be more easily regulated using a viscosifying polymer in conjunction with the filter cake-forming components. Suitable viscosifying polymers include acrylamide polymers, such as partially hydrolyzed polyacrylamides, various examples of which are discussed in more detail below. Advantageously, viscosifying polymers do not appreciably impact the fluid loss control properties of the hydroxyalkylcellulose polymer and the non-biodegradable particulates, thereby allowing low concentrations of the filter cake-forming components to be maintained. In addition, when partially hydrolyzed polyacrylamides are used as the viscosifying polymer during a drilling process, they provide additional benefits of shale and clay stabilization to the earthen formation.

In various embodiments, drilling fluids described herein comprise a carrier fluid, a non-crosslinked hydroxyalkylcellulose polymer, and a plurality of non-biodegradable particulates.

In some embodiments, suitable carrier fluids may comprise an aqueous carrier fluid. Suitable aqueous carrier fluids for use in conjunction with the drilling fluids and drilling methods described herein may include any aqueous fluid used in subterranean operations. Specifically, suitable aqueous carrier fluids may include, for example, fresh water, saltwater (e.g., water containing one or more salts dissolved therein), brine (e.g., saturated salt water), seawater, or any combination thereof. Other aqueous carrier fluid sources are also possible, and generally, the aqueous carrier fluid may be from any source, provided that it does not contain components that adversely affect the stability and/or performance of the drilling fluids of the present disclosure. In certain embodiments, the density and/or viscosity of the carrier fluid may be adjusted, among other purposes, to provide additional particulate transport and suspension properties. In certain embodiments, the pH of the aqueous carrier fluid may be adjusted using an acid, base, buffer, or the like. In illustrative embodiments, the pH of the aqueous carrier fluid may range between about 4 and about 11, or between about 5 and about 9.

As used herein, the term "hydroxyalkylcellulose polymer" refers to a derivatized cellulose polymer chain having at least 10 β-D glucose monomer units and containing, on average, at least one hydroxyalkyl moiety per β-D-glucose monomer unit of the polymer backbone. The number of hydroxyalkyl moieties per β-D-glucose monomer unit of the polymer backbone will be referred to herein as the "degree of substitution." When less than all three of the hydroxy groups of each β-D-glucose monomer unit are functionalized with a hydroxyalkyl group, the residual hydroxy groups may remain unfunctionalized, or they may be further functionalized with various moieties that do not constitute a hydroxyalkyl group. For example, β-D-glucose hydroxy groups that are not functionalized with a hydroxyalkyl group may optionally be functionalized as an alkyl ether (e.g., methyl ethers, ethyl ethers, and the like) in some embodiments or as a polyether derivative (e.g., polyethylene glycol ethers, polypropylene glycol ethers, and the like) in other various embodiments. Polyether derivatives of cellulose, especially mixed polyether/hydroxyalkyl derivatives of cellulose, may be particularly advantageous for maintaining water solubility of the cellulose polymer.

In various embodiments, the hydroxyalkylcellulose polymer may be water-soluble and have a hydroxyalkyl degree of substitution sufficient to convey at least partial water-solubility thereto. In some embodiments, the hydroxyalkylcellulose polymer may have a hydroxyalkyl degree of substitution of about 1 or greater. Lower degrees of hydroxyalkyl substitution may also render the hydroxyalkylcellulose polymer more biodegradable, which may be undesirable in the embodiments described herein. In some or other embodiments, the hydroxyalkylcellulose polymer may have a hydroxyalkyl degree of substitution of about 2 or greater, or about 3 or greater. In some embodiments, the hydroxyalkylcellulose polymer may have a hydroxyalkyl degree of substitution ranging between about 1 and about 3. As indicated above, when all three hydroxy groups of the β-D-glucose monomer units bear hydroxyalkyl groups and the terminal hydroxy groups do not bear further hydroxyalkyl substitution, the cellulose polymer is fully functionalized and has a hydroxyalkyl degree of substitution of three. Since the terminal hydroxy groups can also bear further hydroxyalkyl substitution, possibly in the form of hydroxyalkyl oligomers, the hydroxyalkyl degree of substitution can also be greater than three, regardless of whether the β-D-glucose hydroxy groups are fully functionalized or not. In some embodiments, the hydroxyalkylcellulose polymer may have a degree of substitution of about 4 or greater, or about 5 or greater, or about 6 or greater, or about 7 or greater, or about 8 or greater, or about 9 or greater, or about 10 or greater. In some embodiments, at least a portion of any unfunctionalized β-D-glucose hydroxy groups in the hydroxyalkylcellulose polymer may be further functionalized, for example, with an alkyl ether, a polyether, a carboxyalkyl group, or any combination thereof. When multiple functionalities are present, the degree of substitution in the hydroxyalkylcellulose polymer refers to the overall ratio of added functionalities (i.e., hydroxyalkyl monomers and oligomers) in the polymer compared to the total number of β-D-glucose monomers that are present.

In some embodiments of the present disclosure, the hydroxyalkylcellulose polymer may be non-crosslinked. That is, in such embodiments, the drilling fluids described herein lack a crosslinking agent suitable to promote crosslinking between adjacent polymer chains of the hydroxyalkylcellulose polymer. One of ordinary skill in the art will recognize crosslinking agents that may promote crosslinking between the hydroxy groups in cellulose or cellulose derivatives, including hydroxyalkylcellulose derivatives. In some alternative embodiments of the present disclosure, the hydroxyalkylcellulose polymer may be at least partially crosslinked. For example, if it is desired for the hydroxyalkylcellulose polymer to at least partially viscosify the drilling fluid, the hydroxyalkylcellulose polymer may be at least partially crosslinked.

As discussed above, the hydroxyalkylcellulose polymer may, on average, bear one or more hydroxyalkyl groups on each of the β-D-glucose polymer monomer units. In various embodiments, the hydroxyalkyl groups may bear between 2 and about 10 carbon atoms, and more desirably between 2 and 4 carbon atoms in order to promote water solubility of the hydroxyalkylcellulose polymer. Particularly suitable hydroxyalkylcellulose polymers may include, for example, hydroxyethylcellulose, hydroxypropylcellulose, or any combination thereof, including polymers bearing mixed hydroxyalkyl substitution (e.g., a mixture of hydroxyethyl and hydroxypropyl groups). Alkylated derivatives of hydroxyalkylcellulose polymers (e.g., cellulose polymers having methyl or ethyl groups on the β-D-glucose hydroxyl groups not bearing hydroxyalkyl groups) may also be used similarly in some embodiments of the present disclosure, provided that the alkylated hydroxyalkylcellulose polymers maintain at least partial water solubility. Likewise, polyether derivatives of hydroxyalkylcellulose polymers may also be used in various alternative embodiments of the present disclosure.

In some embodiments, the hydroxyalkylcellulose polymer may comprise hydroxyethylcellulose. One of ordinary skill in the art will recognize that hydroxyethylcellulose and like hydroxyalkylcellulose polymers may display a wide range of molecular weights, the molecular weight being dependent upon the molecular weight of the cellulose polymer prior to hydroxyalkylation and its degree of substitution with hydroxyalkyl groups. One of ordinary skill in the art will further recognize that hydroxyalkylcellulose polymers, particularly hydroxyethylcellulose, may be graded as being "low viscosity" or "high viscosity" polymers, these terms being assigned based upon the measured viscosity of a fixed concentration in water of the hydroxyalkylcellulose polymer as assayed under standard measurement conditions. Other than their measured viscosities under standard test conditions, the primary difference between high viscosity hydroxyethylcellulose and low viscosity hydroxyethylcellulose is the rate at which the two polymers dissolve in an aqueous fluid, with low viscosity hydroxyethylcellulose generally dissolving faster than does high viscosity hydroxyethylcellulose. Various grades of each type of hydroxyethylcellulose are available from a number of manufacturers.

In more particular embodiments of the present disclosure, suitable hydroxyethylcellulose polymers for inclusion in the drilling fluids described herein can include various low viscosity hydroxyethylcellulose polymers. In some embodiments, one may determine that a low viscosity hydroxyethylcellulose is present by measuring the viscosity of a 2 wt. % solution of the polymer in water, such as by using a Hoppler viscometer, a FANN 35 A viscometer, or another like viscometer. More generally, hydroxyethylcellulose polymers measured under such conditions at approximately room temperature may have a viscosity of about 200 cP or less, such as measured using a FANN 35A viscometer at approximately room temperature and pressure and a rotor-bob-torsion spring combination. In more specific embodiments, the measured viscosity of a low viscosity hydroxyethylcellulose polymer under such conditions may be about 20 cP or less.

Other cellulose derivatives that are biologically inert and at least partially water-soluble may also be suitable for use in conjunction with the embodiments described herein. For example, carboxyalkylcellulose polymers (e.g., carboxymethylcellulose) are also believed to be usable in the various embodiments described herein, since they share many properties in common with hydroxyalkylcellulose polymers. However, their charged carboxyl groups may make these polymers less desirable than are uncharged hydroxyalkylcellulose polymers.

In some embodiments of the present disclosure, the non-biodegradable particulates may have a maximum size of about 75 microns, and in other embodiments, the non-degradable particulates may have a maximum size of about 100 microns. Above this size, the particulates may become much more difficult to effectively transport and deposit to form a filter cake when used in drilling a borehole. In addition, larger particulate sizes can increase abrasion of downhole equipment. Further, larger particulate sizes can also result in stratification of a dry powder before mixing in a carrier fluid to form a slurry, thereby resulting in inconsistent drilling fluid performance. In other various embodiments, a minor portion of the non-biodegradable particulates may reside above a particle size of about 75 microns. For example, in some embodiments, the non-biodegradable particulates may have a $d_{90}$ value of about 75 microns, meaning that at most about 10% of the particulates have a size greater than a 75 micron cutoff size.

Below the maximum desired size, the inventors have found that smaller non-biodegradable particulates may more effectively promote fluid loss control and have a lesser impact on viscosification of a drilling fluid. For example, the inventors have found that in drilling fluids differing in only the size of their silica particulates, a drilling fluid containing silica particulates with a $d_{50}$ of 3.6 microns was more effective at promoting fluid loss control than was a drilling fluid containing silica particulates with a $d_{50}$ of 20.5 microns. In some embodiments of the drilling fluids described herein, the non-biodegradable particulates may have a maximum size of about 60 microns, or a maximum size of about 50 microns, or a maximum size of about 40 microns, or a maximum size of about 30 microns, or a maximum size of about 25 microns, or a maximum size of about 20 microns, or a maximum size of about 15 microns, or a maximum size of about 10 microns. In more specific embodiments, the non-degradable particulates may range between about 1 micron and about 25 microns in size, or between about 1 micron and about 20 microns in size, or between about 1 and about 15 microns in size, or between about 1 micron and about 10 microns in size. In some embodiments of the present disclosure, silica nanoparticles may also be used.

In various embodiments, non-biodegradable particulates suitable for use in the drilling fluids described herein may comprise any particulate material falling within the above size ranges and being substantially non-swellable and preferably chemically inert. In some embodiments, suitable non-swellable particulates may comprise non-ionic materials, of which silica particulates are an illustrative example.

In more specific embodiments of the present disclosure, suitable non-biodegradable particulates may comprise silica particulates. As used herein, the term "silica particulates" refers to naturally occurring silica, processed naturally occurring silica, synthetic silica or any combination thereof. Processing of naturally occurring silica may comprise, for example, grinding a naturally occurring silica or sieving a naturally occurring silica to produce a desired particle size. Other non-biodegradable particulates that may be suitable alternatives to silica particulates for use in the embodiments described herein include, for example, alumina particulates, glass microparticles and microspheres, and ceramic microparticles and microspheres. Calcium carbonate particulates may also be suitable non-biodegradable particulates in some embodiments. Although non-biodegradable, calcium carbonate is not particularly chemically inert, and its chemical degradation (e.g., by acids) can promote solubilization of calcium- or carbonate-sensitive polymers such as partially hydrolyzed polyacrylamide polymers, for example.

In further embodiments, mixtures of non-biodegradable particulates having differing ranges of particle sizes may be used in the drilling fluids described herein. By mixing two or more populations of non-biodegradable particulates having differing particle size distributions, particularly non-overlapping particle size distributions, the resulting population of non-biodegradable particulates may have a bimodal or multi-modal particle size distribution. Bimodal and higher particle size distributions may result in more efficient packing of the non-biodegradable particulates when forming a filter cake and provide for more effective fluid loss control.

In more particular embodiments of the present disclosure, the non-biodegradable particulates may comprise silica particulates having a maximum size of about 40 microns. In still more particular embodiments, the non-biodegradable particulates may comprise silica particulates having a maximum size of about 25 microns, or a maximum size of about 20 microns, or a maximum size of about 15 microns, or a maximum size of about 10 microns, or a maximum size of about 5 microns.

In still more specific embodiments, the non-biodegradable particulates may comprise silica particulates in which at least a majority of the silica particulates (i.e., about 50% or greater in number) range between about 1 micron and about 25 microns in size. In some embodiments, at least a majority of the silica particulates may range between about 1 micron and about 25 microns in size and the balance of the silica particulates may be about 75 microns or less in size. In more particular embodiments, the silica particulates may have a $d_{90}$ value of about 75 microns or less. In some embodiments, at least a majority of the silica particulates may range between about 1 micron and about 25 microns in size and the balance of the silica particulates may be about 40 microns or less in size. In more particular embodiments, the silica particulates may have a $d_{90}$ value of about 40 microns or less.

Although the drilling fluids described herein may comprise silica particulates in some embodiments, other non-biodegradable particulates may also be present in addition to or instead of silica particulates, as discussed above. Although various non-biodegradable particulates may be present in the drilling fluids described herein, the drilling fluids may be substantially free of bentonite or other clay materials in some embodiments. By keeping the drilling fluids substantially free of bentonite and like clay materials, the previously discussed issues associated with this material may be lessened or avoided entirely.

The hydroxyalkylcellulose polymer and the non-biodegradable particulates may be present in varying ratios in the drilling fluids described herein. In some embodiments, approximately equal mass quantities of the hydroxyalkylcellulose polymer and the non-biodegradable particulates may be used. More generally, the mass quantities of the hydroxyalkylcellulose polymer and the non-biodegradable particulates are within plus or minus 50% of one another in the drilling fluids described herein. That is, the mass ratio of the hydroxyalkylcellulose polymer to the non-biodegradable particulates, particularly silica particulates, may range between 0.5:1 to about 1.5:1.

Suitable concentrations of the hydroxyalkylcellulose polymer in the drilling fluids described herein may range between about 0.2 ppb (pounds per barrel) and about 2 ppb. In more particular embodiments, the hydroxyalkylcellulose polymer may range in concentration between about 0.5 ppb and about 2 ppb.

Suitable concentrations of the non-biodegradable particulates in the drilling fluids described herein may range between about 0.2 ppb and about 2 ppb. In more particular embodiments, the non-biodegradable particulates may range in concentration between about 0.5 ppb and about 2 ppb.

As discussed above, the hydroxyalkylcellulose polymer and the non-biodegradable particulates are present in the drilling fluids of the present disclosure in concentrations that usually do not substantially impact the viscosity of the drilling fluid. In some embodiments, the viscosity change may be minimized by employing a low viscosity grade hydroxyalkylcellulose, particularly low viscosity hydroxyethylcellulose, at a concentration not effective to substantially impact the viscosity of the drilling fluid.

In alternative embodiments, a mixture of a low viscosity grade hydroxyalkylcellulose and a high viscosity grade hydroxyalkylcellulose may be present to both adjust the viscosity of the drilling fluid and to convey fluid loss control properties thereto. In still other alternative embodiments, a high viscosity grade hydroxyalkylcellulose alone may be used in the drilling fluids to achieve a similar result.

In some or other embodiments, the viscosity of the drilling fluids described herein may be further adjusted by including a viscosity-enhancing polymer in the drilling fluids. In some embodiments, the viscosity-enhancing polymer may comprise a partially hydrolyzed polyacrylamide. As used herein, the term "partially hydrolyzed polyacrylamide" will refer to an acrylamide polymer or co-polymer in which a portion of the amide side chains have been hydrolyzed to carboxylic acids or a salt thereof. Particularly suitable partially hydrolyzed polyacrylamides may include, for example, POLY-BORE, EZ-MUD, EZ-MUD GOLD, EZ-MUD DP, and QUIK-MUD GOLD, which are available from Halliburton Energy Services, Inc. Other viscosity-enhancing polymers may also be suitable for use in the drilling fluids described herein and will be familiar to one having ordinary skill in the art. Other illustrative viscosity-enhancing polymers may include, for example, high molecular weight hydroxyethylcellulose, polyanionic cellulose, polyacrylate and polymethacrylate polymers, polyacrylamide and polymethacrylamide polymers, acrylamide methylpropane sulfonate polymers and copolymers, maleic anhydride polymers and copolymers, and the like. Generally, alternative suitable viscosity-enhancing polymers share at least the characteristic of non-biodegradability with the hydroxyalkylcellulose polymer.

Suitable concentrations of the non-biodegradable particulates in the drilling fluids described herein may range between about 0.05 ppb and about 1.5 ppb. In more particular embodiments, the non-biodegradable particulates may range in concentration between about 0.5 ppb and about 1.25 ppb.

Regardless of how the viscosity of the drilling fluid is ultimately established, the viscosity may lie within a varying range suitable for use in the envisioned applications for the drilling fluid, such as those discussed elsewhere herein. For these and related applications, the viscosity of the drilling fluids of the present disclosure may be maintained in a desirably low range. In various embodiments, the drilling fluids described herein may have a viscosity not exceeding about 35 cP. In more particular embodiments, the drilling fluids may have a viscosity ranging between about 5 cP and about 35 cP, or between about 5 cP and about 30 cP, or between about 10 cP and about 25 cP.

In still other various embodiments, the drilling fluids described herein may further include numerous other components such as, for example, salts, pH control additives, foaming agents, antifoaming agents, breakers, biocides, additional fluid loss control agents, stabilizers, chelating agents, scale inhibitors, gases, mutual solvents, particulates, corrosion inhibitors, oxidizing agents, reducing agents, antioxidants, relative permeability modifiers, other viscosifying agents, proppant particulates, gravel particulates, scale inhibitors, emulsifying agents, de-emulsifying agents, iron control agents, clay control agents, flocculants, scavengers, lubricants, friction reducers, weighting agents, hydrate inhibitors, consolidating agents, any combination thereof, and the like. A person having ordinary skill in the art and the benefit of this disclosure will recognize when such additional components should be included in a drilling fluid used to produce a particular type of borehole, as well as the appropriate amounts to include in the drilling fluid.

Methods for drilling a borehole in a subterranean formation are also described herein. In various embodiments, the drilling methods may comprise providing a drilling fluid comprising a carrier fluid, a non-crosslinked hydroxyalkylcellulose polymer, and a plurality of non-biodegradable particulates; drilling a borehole in the presence of the drilling fluid; and forming a filter cake within the borehole, the filter cake comprising the non-crosslinked hydroxyalkylcellulose polymer and the non-biodegradable particulates. As used herein, the term "borehole" refers to an elongated pathway excavated in an earthen structure, such as a subterranean formation. In some embodiments, the methods may comprise "drill in" processes. The drilling fluids described herein may be used in both normal and reverse circulation drilling techniques.

In some embodiments, forming the filter cake within the borehole may comprise contacting the outside walls of the borehole (i.e., the surface of the earthen formation) with the drilling fluid, and passing at least a portion of the carrier fluid into the porosity of the subterranean formation (i.e., through spurt loss). As the carrier fluid passes into the porosity of the subterranean formation, it deposits the hydroxyalkylcellulose polymer and the non-biodegradable particulates as the filter cake, eventually shutting off flow into the formation's porosity as the filter cake builds in thickness.

In some embodiments, the methods described herein may further comprise removing the filter cake from the walls of the borehole. Removing at least a portion of the filter cake from the borehole can allow the resumption of fluid flow into the interior of the borehole from a subterranean formation. In some embodiments, removing the filter cake may comprise breaking the polymer within the filter cake. In this respect, the non-degradable particulates comprising the filter cake do not substantially impact the polymer breaking process. In some embodiments, the polymer within the filter cake may be broken through contacting the filter cake with an oxidant, a surfactant, a dispersant, or any combination thereof. Suitable examples of these breakers will be familiar to one having ordinary skill in the art. Mechanical agitation to remove the filter cake can also be performed. Various combinations of the filter cake removal techniques may also be used.

The exemplary drilling fluids disclosed herein may directly or indirectly affect one or more components or pieces of equipment associated with the preparation, delivery, recapture, recycling, reuse, and/or disposal of the disclosed drilling fluids. For example, and with reference to FIG. 1, the disclosed drilling fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed components may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed components may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed components may be stored, reconditioned, and/or regulated until added to the drilling fluid 122.

As mentioned above, the disclosed drilling fluids may directly or indirectly affect the components and equipment of the drilling assembly 100. For example, the disclosed drilling fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used to store, monitor, regulate, and/or recondition the exemplary drilling fluids.

The disclosed drilling fluids may directly or indirectly affect the pump 120, which representatively includes any conduits, pipelines, trucks, tubulars, and/or pipes used to fluidically convey the drilling fluids downhole, any pumps, compressors, or motors (e.g., topside or downhole) used to drive the drilling fluids into motion, any valves or related joints used to regulate the pressure or flow rate of the drilling fluids, and any sensors (i.e., pressure, temperature, flow rate, etc.), gauges, and/or combinations thereof, and the like. The disclosed drilling fluids may also directly or indirectly affect the mixing hopper 134 and the retention pit 132 and their assorted variations.

The disclosed drilling fluids may also directly or indirectly affect the various downhole equipment and tools that may come into contact with the drilling fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluids may also directly or indirectly affect any downhole heat exchangers, valves and corresponding actuation devices, tool seals, packers and other wellbore isolation devices or components, and the like associated with the wellbore 116. The disclosed drilling fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed drilling fluids may also directly or indirectly affect any transport or delivery equipment used to convey the drilling fluids to the drilling assembly 100 such as, for example, any transport vessels, conduits, pipelines, trucks, tubulars, and/or pipes used to fluidically move the drilling fluids from one location to another, any pumps, compressors, or motors used to drive the drilling fluids into motion, any valves or related joints used to regulate the pressure or flow rate of the drilling fluids, and any sensors (i.e., pressure and temperature), gauges, and/or combinations thereof, and the like.

Embodiments disclosed herein include:

A. Methods for drilling a borehole. The methods comprise: providing a drilling fluid comprising a carrier fluid, a non-crosslinked hydroxyalkylcellulose polymer, and a plurality of non-biodegradable particulates; drilling a borehole in the presence of the drilling fluid; and forming a filter cake within the borehole, the filter cake comprising the non-crosslinked hydroxyalkylcellulose polymer and the non-biodegradable particulates.

B. Drilling fluids. The drilling fluids comprise: a carrier fluid; a non-crosslinked hydroxyalkylcellulose polymer; and a plurality of non-biodegradable particulates.

Each of embodiments A and B may have one or more of the following additional elements in any combination:

Element 1: wherein the non-biodegradable particulates have a maximum size of about 75 microns.

Element 2: wherein the non-biodegradable particulates comprise silica particulates.

Element 3: wherein the silica particulates have a maximum size of about 40 microns.

Element 4: wherein at least a majority of the silica particulates range between about 1 micron and about 25 microns in size.

Element 5: wherein the non-crosslinked hydroxyalkylcellulose polymer comprises hydroxyethylcellulose.

Element 6: wherein the drilling fluid is substantially free of bentonite.

Element 7: wherein the borehole defines a water well or is within a mineral deposit.

Element 8: wherein the drilling fluid further comprises a viscosity-enhancing polymer.

Element 9: wherein the viscosity-enhancing polymer comprises a partially hydrolyzed polyacrylamide.

Element 10: wherein a viscosity of the drilling fluid ranges between about 5 cP and about 35 cP.

Element 11: wherein the non-biodegradable particulates comprise silica particulates and the non-crosslinked hydroxyalkylcellulose polymer comprises hydroxyethylcellulose.

Element 12: wherein the silica particulates have a maximum size of about 40 microns and at least a majority of the silica particulates range between about 1 micron and about 25 microns in size.

Element 13: wherein a ratio of hydroxyethylcellulose to silica particulates in the drilling fluid ranges between about 0.5:1 to about 1.5:1.

By way of non-limiting example, exemplary combinations applicable to A and B include:

The method of A in combination with elements 1 and 2.
The method of A in combination with elements 1, 2 and 4.
The method of A in combination with elements 6 and 7.
The method of A in combination with elements 8 and 10.
The method of A in combination with elements 11 and 12.
The method of A in combination with elements 11 and 13.
The drilling fluid of B in combination with elements 1 and 2.
The drilling fluid of B in combination with elements 1, 2 and 4.
The drilling fluid of B in combination with elements 6 and 8.
The drilling fluid of B in combination with elements 8 and 10.
The drilling fluid of B in combination with elements 11 and 12.
The drilling fluid of B in combination with elements 11 and 13.

To facilitate a better understanding of the embodiments of the present disclosure, the following examples of preferred or representative embodiments are given. In no way should the following examples be read to limit, or to define, the scope of the disclosure.

EXAMPLES

Example 1: Fluid Loss Control and Viscosity Measurements

Drilling fluid compositions containing varying amounts of a viscosity-enhancing polymer, silica particulates, and low viscosity hydroxyethylcellulose were formulated as set forth in Tables 1 and 2. The viscosity-enhancing polymer was a partially hydrolyzed polyacrylamide having a molecular weight of 20 million, available from Halliburton Energy Services, Inc. The low viscosity hydroxyethylcellulose was Tylose H 27 NG4, supplied from Shin-Etsu. The silica particulates had either a $d_{50}$ value of 3.6 microns (Zeothix 265, Huber Engineered Materials) or 20.5 microns (SSA-1, Halliburton Energy Services). Viscosity measurements were obtained using a Fann 35A viscometer and a R1-B1-F1 rotor-bob-torsion spring combination at ambient temperature and pressure. Fluid loss was measured in terms of the quantity of filtrate collected over 30 minutes after passing the drilling fluid composition through a hardened porous filter paper using an API filter press at ambient temperature and a pressure of 100 psi.

TABLE 1

|  | Sample 1 | Sample 2 | Sample 3 | Sample 4 | Sample 5 | Sample 6 |
| --- | --- | --- | --- | --- | --- | --- |
| Composition |  |  |  |  |  |  |
| PHPA[a] (lb/bbl) | 0.42 | 0.42 | 0.42 | 0.42 | 0.42 | 0.42 |
| HEC[b] (lb/bbl) | — | 0.75 | 1.5 | — | — | 0.75 |
| Silica[c] (lb/bbl) | — | — | — | 0.75 | 1.5 | 0.75 |

TABLE 1-continued

|  | Sample 1 | Sample 2 | Sample 3 | Sample 4 | Sample 5 | Sample 6 |
|---|---|---|---|---|---|---|
| Rheology |  |  |  |  |  |  |
| 600 rpm dial reading | 30 | 40 | 50 | 35 | 40 | 40 |
| 300 rpm dial reading | 19 | 25 | 30 | 20 | 20 | 24 |
| 200 rpm dial reading | 15 | 19 | 20 | 16 | 15 | 18 |
| 100 rpm dial reading | 10 | 13 | 12 | 10 | 9 | 10 |
| 6 rpm dial reading | 3 | 3.5 | 2 | 3 | 3 | 2.5 |
| 3 rpm dial reading | 2.5 | 3 | 1 | 2.5 | 2 | 2 |
| Apparent Viscosity (cP) | 15 | 20 | 25 | 17.5 | 20 | 20 |
| Plastic Viscosity (cP) | 11 | 15 | 20 | 15 | 20 | 16 |
| Yield Point (lb/100 ft$^2$) | 8 | 10 | 10 | 5 | 0 | 8 |
| 10-Second Gel (lb/100 ft$^2$) | 2.5 | 2.5 | 3 | 3 | 4 | 4 |
| 10-Minute Gel (lb/100 ft$^2$) | 7 | 7.5 | 6 | 7 | 6.5 | 6.5 |
| Fluid Loss |  |  |  |  |  |  |
| Volume of Filtrate Over 30 Minutes (mL) | 39 | 33 | 28 | 20 | 18 | 11.5 |

$^a$PHPA = partially hydrolyzed polyacrylamide
$^b$HEC = hydroxyethylcellulose
$^c$d$_{50}$ = 3.6 microns

TABLE 2

|  | Sample 7 | Sample 8 | Sample 9 | Sample 10 | Sample 11 |
|---|---|---|---|---|---|
| Composition |  |  |  |  |  |
| PHPA$^a$ (lb/bbl) | 0.1 | 0.16 | 0.21 | 0.32 | 0.42 |
| HEC$^b$ (lb/bbl) | 0.3 | 0.47 | 0.63 | 0.94 | 1.25 |
| Silica$^d$ (lb/bbl) | 0.25 | 0.38 | 0.5 | 0.75 | 1 |
| Rheology |  |  |  |  |  |
| 600 rpm dial reading | 11.5 | 17 | 21 | 30 | 47 |
| 300 rpm dial reading | 7.5 | 10 | 13 | 19 | 28 |
| 200 rpm dial reading | 6.5 | 8 | 10 | 14.5 | 21 |
| 100 rpm dial reading | 3.5 | 5 | 6.5 | 9 | 13.5 |
| 6 rpm dial reading | 1 | 1.5 | 2 | 3 | 4 |
| 3 rpm dial reading | 0.5 | 1 | 1.5 | 2 | 3.5 |
| Apparent Viscosity (cP) | 5.8 | 8.5 | 10.5 | 15 | 23.5 |
| Plastic Viscosity (cP) | 4 | 7 | 8 | 11 | 19 |
| Yield Point (lb/100 ft$^2$) | 3.5 | 3 | 5 | 8 | 9 |
| 10-Second Gel (lb/100 ft$^2$) | 0.5 | 1.5 | 2 | 3 | 4 |
| 10-Minute Gel (lb/100 ft$^2$) | 1 | 3 | 4 | 5 | 7 |
| Fluid Loss |  |  |  |  |  |
| Volume of Filtrate Over 30 Minutes (mL) | 24.5 | 16 | 14 | 13 | 12 |

$^a$PHPA = partially hydrolyzed polyacrylamide
$^b$HEC = hydroxyethylcellulose
$^d$d$_{50}$ = 20.5 microns As shown above, the combination of hydroxyethylcellulose and silica particulates in Sample 6 produced the best fluid loss control properties at the lowest additive concentrations, and the drilling fluid rheology was not significantly modified from the control fluid (Sample 1). Comparing Samples 10 and 11 with Sample 6, it can be seen that larger silica particulates produced slightly less effective fluid loss control while marginally increasing the measured rheological properties of the drilling fluids.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A drilling method comprising:
   providing a drilling fluid comprising a carrier fluid, a non-crosslinked hydroxyethylcellulose polymer, and a plurality of silica particulates;
   drilling a borehole in the presence of the drilling fluid; and
   forming a filter cake within the borehole, the filter cake comprising the non-crosslinked hydroxyethylcellulose polymer and the silica particulates,
   wherein the silica particulates have a particle size greater than 1 micron and less than 20 microns,
   wherein a mass ratio of the non-crosslinked hydroxyethylcellulose polymer to the silica particulates is within a range from 0.5:1 to about 1.5:1.

2. The drilling method of claim 1, wherein the drilling fluid is substantially free of bentonite.

3. The drilling method of claim 1, wherein the borehole defines a water well or is within a mineral deposit.

4. The drilling method of claim 1, wherein the drilling fluid further comprises a viscosity-enhancing polymer.

5. The drilling method of claim 4, wherein the viscosity-enhancing polymer comprises a partially hydrolyzed polyacrylamide.

6. The drilling method of claim 4, wherein a viscosity of the drilling fluid ranges between about 5 cP and about 35 cP.

7. A drilling fluid comprising:
   a carrier fluid;
   a non-crosslinked hydroxyethylcellulose polymer; and
   a plurality of silica particulates,
   wherein the non-biodegradable silica particulates have a particle size greater than 1 micron and less than 20 microns,
   wherein a mass ratio of the non-crosslinked hydroxyethylcellulose polymer to the silica particulates is within a range from 0.5:1 to about 1.5:1.

8. The drilling fluid of claim 7, further comprising:
   a viscosity-enhancing polymer.

9. The drilling fluid of claim 8, wherein the viscosity-enhancing polymer comprises a partially hydrolyzed polyacrylamide.

* * * * *